Sept. 5, 1933.   J. H. WAGENHORST   1,925,738
VEHICLE WHEEL
Filed June 13, 1931
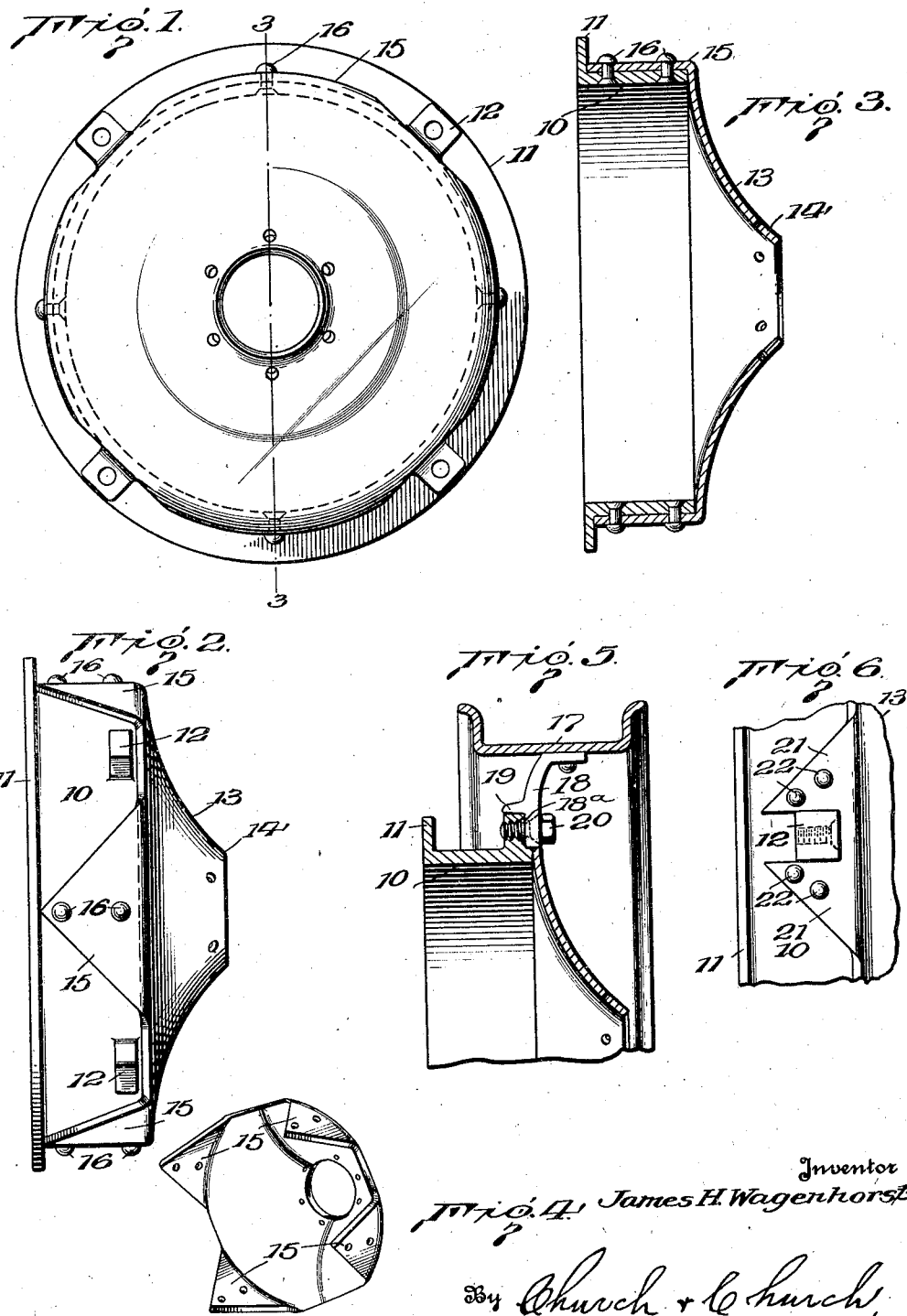

Patented Sept. 5, 1933

1,925,738

UNITED STATES PATENT OFFICE 1,925,738

VEHICLE WHEEL

James H. Wagenhorst, Detroit, Mich., assignor, by mesne assignments, to Kelsey-Hayes Wheel Company, Detroit, Mich., a corporation of Delaware Application June 13, 1931. Serial No. 544,215

7 Claims. (Cl. 301—6)

My invention relates to improvements in vehicle wheels and has to do, more particularly, with an improved wheel of the type in which the side wall of the brake drum constitutes the rim supporting portion of the wheel.

The principal object of my invention is to provide a demountable rim vehicle wheel which is strong, yet inexpensive to manufacture.

A further object of my invention is to provide an improved brake drum of the type having a cast iron braking surface.

A further object of my invention is to provide a novel construction and method of making a brake drum having a cast iron braking flange by which costs may be reduced and production increased.

Further objects, and objects relating to details and economies of construction, will definitely appear from the detailed description to follow. In one instance, I accomplish the objects of my invention by the devices and means described in the following specification. My invention is clearly set forth and defined in the appended claims. A structure constituting a preferred embodiment of my invention is illustrated in the accompanying drawing, forming a part of this specification, in which:

Figure 1 is a front view of a brake drum construction embodying my invention;

Fig. 2 is a side view of the brake drum shown in Fig. 1;

Fig. 3 is a vertical sectional view through the brake drum shown in Fig. 1 and taken on line 3—3 of that figure;

Fig. 4 is a view, in perspective, of the web member constituting a portion of the brake drum shown in Figs. 1, 2 and 3;

Fig. 5 is a fragmentary sectional view of a wheel construction formed by mounting a tire carrying rim upon a brake drum of the type shown in Fig. 1; and Fig. 6 is a fragmentary view of a slightly modified form of brake drum construction in which the web member is interlocked with the lugs of the braking flange.

In the drawing, the same reference numerals refer to the same parts throughout the several views.

In general, my invention consists in forming a heavy annulus or braking flange of a material such as cast iron. A web portion of sheet metal is provided for mounting this flange upon the hub of the wheel. The central portion of the web member is adapted for attachment to a hub member and the periphery of the web member is provided with integral tongues which overlie and engage the annular flange and are secured thereto by fastening means such as rivets or welding. If the brake drum is to be used as the central portion of the wheel with which it is associated, the braking flange is formed with a plurality of radially outwardly extending lugs. Upon these lugs are mounted the lugs of a tire carrying rim and fastening means such as bolts are employed to secure the rim lugs to the lugs of the braking flange, thereby providing an extremely simple wheel construction.

Referring to the numbered parts of the accompanying drawing, which illustrate a preferred embodiment of my invention, I have shown a braking flange 10, preferably formed from cast iron. This flange is provided with a radially extending flange 11 along its rear edge. Formed integral with the annulus 10, and located at spaced points about the circumference thereof, are provided lugs 12 which are adjacent the front edge of the annulus. The web member by which the braking flange 10 is mounted upon the hub, not shown, comprises a side wall portion 13, a portion 14 adapted for attachment to the hub by rivets, bolts, welding or the equivalent, and spaced tongues 15 which overlie the outer surface of the braking flange for the major portion of its width and are snugly disposed thereon in engagement therewith. Rivets 16, or the equivalent, secure these tongues to the flange 10. In the embodiment shown, the web member is formed from a square sheet of metal apertured in the center to receive the hub. The width of the sheet is substantially equal to the outer diameter of the braking flange 10 and the corners thereof are folded over along arcs equidistant from the center of the sheet to provide the tongue portions 15 which lap and engage the periphery of the braking flange 10. In the formation of a brake drum of conventional diameter and width in accordance with this invention, it will be found that the tongues 15 of the web will extend substantially across the entire width of the braking flange 10. A pair of rivets 16 may therefore be used on each tongue to provide an extremely strong but inexpensive construction. The lugs 12 are perforated and threaded to receive bolts 20. The lugs 12 are preferably set in slightly from the front edge of the flange and their outermost surface is square. In Fig. 5 a tire carrying rim 17 is provided having attached lugs 18 equal in number and spacing to those 12 of the braking flange. These lugs 18 are of such length as to lap the lugs 12 and are perforated for reception of the rim securing bolts 20. The lugs 18 are also preferably formed with shoulder portions 19 which bear upon the square outer surfaces of the lugs 12 and take the load strain from the bolts 20. A portion of the load strain may also be transferred directly to the brake drum by forming the rim attached lugs 18 of such length that they bear directly upon the portions of the braking flange and the web member directly forward of the lugs 12. The lugs 12 and 18 are disposed intermediate the tongues 15 and may be of any number, depending upon the number of tongues 15 formed on the web member. In the disclosed embodiment there are four because of the square character of the blank from which the web member is formed.

In Fig. 6 there is disclosed a slightly modified brake drum construction in which the tongue 21 is notched to receive the lug 12. Rivets 22 may be employed on both sides of the lug in that construction. The principal advantage to be gained by the slotted tongue construction is the keying effect of the interlock. Torque occuring by reason of power transmission from the hub to the rim is not entirely taken upon the rivets 22 but is taken directly upon the cheeks of the lug 12. There is, therefore, absolutely no tendency to shear the rivets, and far less tendency to break the lugs at their junction with the braking flange proper. In a similar manner, the structure is admirably well suited to resist torque strains upon the lug due to braking, because a portion of the strain between the outer portion of the lug 12 which is secured to the rim lug 18 and the braking flange proper is taken from the junction of the lug 12 and flange, by the rivets 22 and the tongue 21 and transferred directly upon the cheeks of the lug 12. This is important when it is remembered that these lugs 12 are merely integrally cast portions of the flange 10.

I am aware that the structure herein embodied may be varied considerably without departing from the spirit of my invention. I, therefore, claim my invention broadly as indicated by the appended claims.

What I claim is:

1. A brake drum comprising an annular cast iron braking flange having a plurality of integral lugs extending radially outwardly therefrom at spaced intervals and a sheet metal web member for mounting said flange about a hub member, said web member comprising a central portion for attachment to the hub member, a sidewall portion, and a plurality of notched tongues which overlie said flange and straddle said lugs to key the flange and web member against relative rotation, and means for holding said tongues straddled upon said lugs.

2. A vehicle wheel comprising an annular cast iron braking flange having a plurality of integral lugs extending radially outwardly therefrom at spaced intervals and a sheet metal web member for mounting said flange about a hub member, said web member comprising a central portion for attachment to the hub member, a sidewall portion, and a plurality of notched tongues which overlie said flange and straddle said lugs to key the flange and web member against relative rotation, means for holding said tongues straddled upon said lugs, a tire carrying rim, lugs extending radially inwardly from said rim, and means for securing the lugs of said rim to the lugs of said braking flange.

3. A vehicle wheel comprising an annular cast iron braking flange having a plurality of integral lugs extending radially outwardly therefrom at spaced intervals and a sheet metal web member for mounting said flange about a hub member, said web member comprising a central portion for attachment to the hub member, a sidewall portion, and a plurality of notched tongues which overlie said flange and straddle said lugs to key the flange and web member against relative rotation, means for holding said tongues straddled upon said lugs, a tire carrying rim, lugs extending radially inwardly from said rim and lapping the lugs of said braking flange, said rim lugs also having shoulders which radially abut the lugs of said braking flange, and bolts extending through the lapping portions of the said lugs for detachably mounting the rim upon the brake drum.

4. A vehicle wheel comprising an annular cast iron braking flange having a plurality of integral lugs extending radially outwardly therefrom at spaced intervals and a sheet metal web member for mounting said flange about a hub member, said web member comprising a central portion for attachment to the hub member, a sidewall portion, and a pluarlity of tongues which overlie said flange intermediate the lugs, means for securing said tongues to said flange, a tire carrying rim, lugs extending radially inwardly from said rim, and means for securing the lugs of said rim to the lugs of said braking flange.

5. A vehicle wheel comprising an annular cast iron braking flange having a plurality of integral lugs extending radially outwardly therefrom at spaced intervals and a sheet metal web member for mounting said flange about a hub member, said web member comprising a central portion for attachment to the hub member, a sidewall portion, and a plurality of tongues which overlie said flange intermediate the lugs, means for securing said tongues to said flange, a tire carrying rim, lugs extending radially inwardly from said rim and lapping the lugs of said braking flange, said rim lugs also having shoulders which radially abut the lugs of said braking flange, and bolts extending through the lapping portions of said lugs for detachably mounting the rim upon the brake drum.

6. A brake drum comprising a cast metal annulus having a plurality of perforated lugs extending radially outwardly therefrom at spaced intervals, and a sheet metal web member for mounting said annulus comprising a central portion for securement to a hub, a sidewall portion and tongues extending from said sidewall portion, overlying said annulus and secured thereto.

7. A brake drum comprising a cast metal annulus having a plurality of perforated lugs extending radially outwardly therefrom at spaced intervals, and a sheet metal web member for mounting said annulus comprising a central portion for securement to a hub, a sidewall portion and tongues extending from said sidewall portion, overlying said annulus between said lugs and secured thereto.

JAMES H. WAGENHORST.